United States Patent
Albach et al.

(10) Patent No.: US 10,927,227 B2
(45) Date of Patent: Feb. 23, 2021

(54) FLEXIBLE FOAM WITH HALOGEN-FREE FLAME RETARDANT

(71) Applicant: Covestro Deutschland AG, Leverkusen (DE)

(72) Inventors: Rolf Albach, Cologne (DE); Petra Venner, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/629,355

(22) PCT Filed: Jul. 11, 2018

(86) PCT No.: PCT/EP2018/068732
§ 371 (c)(1),
(2) Date: Jan. 8, 2020

(87) PCT Pub. No.: WO2019/011956
PCT Pub. Date: Jan. 17, 2019

(65) Prior Publication Data
US 2020/0140640 A1 May 7, 2020

(30) Foreign Application Priority Data

Jul. 11, 2017 (EP) .................................... 17180818
Jun. 18, 2018 (EP) .................................... 18178303

(51) Int. Cl.
| | | |
|---|---|---|
| *C08J 9/12* | (2006.01) | |
| *C08J 9/00* | (2006.01) | |
| *C08J 9/14* | (2006.01) | |
| *C08L 75/08* | (2006.01) | |

(52) U.S. Cl.
CPC .......... *C08J 9/0038* (2013.01); *C08J 9/0095* (2013.01); *C08J 9/125* (2013.01); *C08J 9/127* (2013.01); *C08J 9/142* (2013.01); *C08L 75/08* (2013.01); *C08J 2201/022* (2013.01); *C08J 2203/182* (2013.01); *C08J 2205/052* (2013.01); *C08J 2205/06* (2013.01); *C08J 2375/08* (2013.01); *C08L 2201/02* (2013.01); *C08L 2203/14* (2013.01)

(58) Field of Classification Search
CPC ................. C08G 18/48; C08G 18/7607; C08G 18/7621; C08G 18/7664; C08G 2101/0008; C08G 2101/005; C08J 9/0038; C08J 9/0095; C08J 9/125; C08J 9/127; C08J 9/142; C08J 2201/022; C08J 2203/182; C08J 2205/052; C08J 2205/06; C08J 2375/04; C08J 2375/08; C08K 5/5399; C08L 75/08; C08L 2201/02; C08L 2203/14
See application file for complete search history.

(56) References Cited

U.S. PATENT DOCUMENTS

| | | |
|---|---|---|
| 3,450,799 A | 6/1969 | Kober et al. |
| 4,089,835 A | 5/1978 | Konig et al. |
| 4,248,930 A | 2/1981 | Haas et al. |
| 4,260,530 A | 4/1981 | Reischl et al. |
| 4,263,408 A | 4/1981 | Meyborg et al. |
| 4,374,209 A | 2/1983 | Rowlands |
| 4,644,017 A | 2/1987 | Haas et al. |
| 5,039,712 A * | 8/1991 | Brock ........................ C08J 9/08 521/126 |
| 5,063,252 A * | 11/1991 | Ruckes ................... C07F 9/065 521/108 |
| 2003/0204042 A1 | 10/2003 | Moethrath et al. |
| 2008/0114086 A1 | 5/2008 | Lorenz et al. |
| 2009/0061716 A1 | 3/2009 | Tanaka et al. |
| 2010/0227938 A1* | 9/2010 | Bauer ................ C08G 18/6696 521/170 |
| 2011/0201761 A1 | 8/2011 | Hirt et al. |

FOREIGN PATENT DOCUMENTS

| | | |
|---|---|---|
| CA | 1182600 A | 2/1985 |
| CN | 102766167 A | 11/2012 |
| CN | 102766168 A | 11/2012 |

(Continued)

OTHER PUBLICATIONS

Becker, G.W. et al., Polyurethane, Kunststoff Handbuch, 1983, vol. 2, p. 104-105, Munich, G. Oertel (ed.).
Quagliano, J.C. et al., Recent Advances on the Utilization of Nanoclays and Organophosphorus Compounds in Polyurethane Foams for Increasing Flame Retardancy, Structural Nanocomposites, Engineering Materials, Berlin Heidelberg, Springer Verlag, 2013, vol. 1, p. 249-258.
Levchik, S.V., et al., A Review of Recent Progress in Phosphorous-Based Flame Retardants, J. Fire. Sci., 2006, vol. 24, p. 345-364.
Chen, L., et al., A Review on Flame Retardant Technology in China, Part 1: Development of Flame Retardants, Polym. Adv. Technol., 2010, vol. 21, p. 1-26.

(Continued)

*Primary Examiner* — John M Cooney
(74) *Attorney, Agent, or Firm* — N. Denise Brown

(57) ABSTRACT

The invention relates to flame-retardant flexible polyurethane foams with phosphazene and to methods for producing PUR flexible foams by reacting a component A containing: A1, an isocyanate-reactive component, A2, a propellant containing water, A3, optionally auxiliary agents and additives, and A4, a flame retardant, with B, an isocyanate component. The invention is characterized in that the flame retardant A4 contains a phosphazene according to the formula (I): $[P_m N_m X_k]$ (I), where X independently of one another represents O-aryl or NR-aryl, at least one aryl group is substituted, X can represent a bridge, R is selected from the group of H, C1-C4 alkyl, and aryl, and m represents a number from 1 to 5, particularly preferably 3 or 4, k depends on m and represents a number from 0 to 2m, and the phosphazene does not have any groups which are reactive towards isocyanates.

18 Claims, No Drawings

(56) References Cited

FOREIGN PATENT DOCUMENTS

| CN | 102816186 A | 12/2012 |
| CN | 103992353 A | 8/2014 |
| CN | 106009620 A | 10/2016 |
| EP | 2910585 A | 8/2015 |
| GB | 2072204 A | 9/1981 |
| JP | 51037151 A2 | 3/1976 |
| JP | H01190718 A | 7/1989 |
| JP | 2011028129 A2 | 2/2011 |
| JP | 2013001833 A2 | 1/2013 |
| JP | 2014141598 A2 | 8/2014 |
| JP | 2016102177 A | 6/2016 |
| JP | 2016102178 A | 6/2016 |

OTHER PUBLICATIONS

Lu, S.-Y., et al., Recent Developments in the Chemistry of Halogen-Free Flame Retardant Polymers, Prog. Polym. Sci., 2002, vol. 27, p. 1661-1721.

Kurachi, Y. et al., Synthesis and properties of urethane foams having a N3P3 ring compound, J. Mater. Sci., 1989, vol. 24, p. 2761-2764.

Reed, N.N. et al., Stealth Star Polymers: A New High-Loading Scaffold for Liquid-Phase Organic Synthesis, Org. Lett., 2000, vol. 2, p. 1311-1313.

Siefken, W., Justus Liebigs Annalen der Chemie, vol. 562, p. 75-136.

Oertel, G. et al., Kunststoff-Handbuch, 1993, vol. VII, 3rd ed., p. 104-127, p. 139-265, Munich.

Chemistry and Technology of Polyols for Polyurethanes, Shawbury, 2005, p. 55 et. seq. in Chapter 4: Oligo-Polyols for Elastic Polyurethanes, p. 263 et seq. in Chapter 8: Polyester Polyols for Elastic Polyurethanes, p. 321 et seq. in Chapter 13: Polyether Polyols for Rigid Polyurethane Foams, and p. 419 et seq. in Chapter 16: Polyester Polyols for Rigid Polyurethane Foams.

International Search Report, PCT/EP2018/068732, dated Oct. 5, 2018, Authorized officer: Sandra Lanz.

* cited by examiner

FLEXIBLE FOAM WITH HALOGEN-FREE FLAME RETARDANT

CROSS-REFERENCE TO RELATED APPLICATION

This application is a national stage application under 35 U.S.C. § 371 of PCT/EP2018/068732, filed Jul. 11, 2018, which claims the benefit of European Application No. 17180818.1, filed Jul. 11, 2017, and European Application No. 18178303.6, filed Jun. 18, 2018, each of which is incorporated herein by reference.

FIELD

The present invention relates to flame-retarded, open-celled flexible polyurethane foams (hereinbelow also referred to as "flexible PUR foams") comprising phosphazene, to processes for the production thereof and to the use of phosphazene as a flame retardant in systems for producing flexible PUR foams.

BACKGROUND

Like all organic polymers flexible PUR foams are flammable, the large surface area per unit mass in foams further reinforcing this behavior. Flexible PUR foams are employed for example in the furniture industry as seat cushions or generally as sound and thermal insulation materials. Endowment with flame retardancy through added flame retardants is therefore necessary in many applications of flexible PUR foams. There are flame retardants which suffocate the flame in the gas phase and there are flame retardants which protect the surface of the polymeric material by favoring charring or forming a glassy coating. Preferably employed flame retardants include halogen-containing compounds and nitrogen and phosphorus compounds. Compounds containing halogens and low-valence phosphorus compounds are typical representatives of flame retardants that suffocate flames. Higher-valence phosphorus compounds are designed to bring about a catalytic cleavage of the polyurethanes in order to form a solid, polyphosphate-containing charred surface. This intumescent layer protects the material from further combustion (G. W. Becker, D. Braun: Polyurethane. In: G. Oertel (Ed.), Kunststoff Handbuch, Munich, Carl Hanser Verlag, 1983, 2, 104-1-5).

Typical flame retardants are for example melamine or trischloropropyl phosphate (TCPP). Solids such as melamine have the disadvantage of sedimenting in the reaction mixture. Introduction of insoluble solids into the reaction mixture causes the obtained foams to become hard. This is often difficult to compensate. Liquid flame retardants such as TCPP do not have this disadvantage. By contrast compounds such as TCPP have the advantage of being relatively volatile, thus being able to intervene in the free-radical chain reaction taking place in a flame. This has the result that the temperature of the flame is reduced which in turn reduces the decomposition of the enflamed material.

However, one disadvantage of the halogen-containing representatives of these classes in particular is that they are relatively volatile and can therefore migrate out of the foam (J. C. Quagliano, V. M. Wittemberg, I. C. G. Garcia: Recent Advances on the Utilization of Nanoclays and Organophosphorus Compounds in Polyurethane Foams for Increasing Flame Retardancy. In: J. Njuguna (Ed.), Structural Nanocomposites, Engineering Materials, Berlin Heidelberg, Springer Verlag, 2013, 1, 249-258) and that the use thereof results in the formation of corrosive hydrohalic acid in the combustion process.

The increasing prevalence of organic halogen compounds which in some cases have health-hazardous effects in the environment have shifted interest to halogen-free alternatives, for example to halogen-free phosphate esters and phosphite esters (S. V. Levchik, E. D. Weil: A Review of Recent Progress in Phosphorus-based Flame Retardants, J. Fire Sci., 2006, 24, 345-364) and to red phosphorus.

But these halogen-free alternatives also have disadvantages: They are in some cases sensitive to hydrolysis under the alkaline conditions typical for PUR foam systems or show inadequate effectiveness. Red phosphorus has disadvantages for example in respect of rapid absorption of moisture and rapid oxidation which leads to a loss of flame retardancy and possibly formation of toxic phosphines and also has a propensity for powder explosions. Red phosphorus is often microencapsulated to overcome these problems (L. Chen, Y.-Z. Wang: A review on flame retardant technology in China. Part 1: development of flame retardants, Polym. Adv. Technol., 2010, 21, 1-26).

Phosphazenes are hybrid inorganic/organic materials which can have both linear and cyclic molecular structures (S.-Y. Lu, I. Hammerton: Recent developments in the chemistry of halogen-free flame retardant polymers, Prog. Polym. Sci., 2002, 27, 1661-1721). The use of cyclic phosphazenes as flame retardants has been described for example for thermoplastic polyurethanes in JP 51037151 A2, for printed circuit boards in JP 2011028129 A2, for hot melt adhesives in JP 2013001833 A2, for textile coating in JP 2014141598 A2 and for fibers in WO 2007/074814 A1.

Rigid polyurethane foams have been admixed with various, usually NCO-reactive, phosphazenes to obtain a higher thermal stability (CN 103992353 A and CN 102816186 A).

Flexible polyurethane foams have been crosslinked with NCO-reactive phosphazenes. This reduced the vapor pressure and rendered the additive ineffective in the gas phase. Thus, JP 01190718 reports that substances of the type $P_3N_3(NHCH_2OH)_m(OR)_{6-m}$ resulted in a reduction in smoke gas density, i.e. in complete combustion of flexible polyurethane foams. $P_3N_3(NH_2)_2(OC_6H_5)_4$ (melting point 104° C.-105° C.) was incorporated in a proportion of 25% by weight in component B in a TDI-based flexible polyurethane foam (Y. Kurachi, T. Okuyama, T. Oohasi; J. Mater. Sci., 1989, 24, 2761-2764) and resulted in a slight improvement in the LOI (Limiting Oxygen Index).

However, the improved fire properties of the polyurethane foams in the abovementioned publications are obtained with a very high weight fraction of phosphazene or even with phosphazene derivatives making up the entire polyol component.

SUMMARY

Furthermore, phosphazenes incorporable into a polyurethane matrix via isocyanate-reactive groups are costly and inconvenient to produce in a multistage procedure since they utilize protecting group strategies (CN 102766167 A, CN 102766168 A and N. N. Reed, K. D. Janda: Stealth Star Polymers: A New High-Loading Scaffold for Liquid-Phase Organic Synthesis, Org. Lett., 2000, 2, 1311-1313).

The invention accordingly has for its object to allow production of flexible PUR foams containing halogen-free flame retardants, wherein the disadvantages of the prior art are overcome in respect of the process and the produced flexible PUR foams and in particular the produced flexible PUR foams shall nevertheless exhibit low apparent densities and compressive strengths and a good flame retardancy.

This object was achieved by the inventive use of phosphazene of formula (I) as a flame retardant component in the production of flexible PUR foams.

The present invention provides a process for producing open-celled flexible PUR foams by reaction of a component A containing
A1 an isocyanate-reactive component,
A2 blowing agent containing water,
A3 optionally auxiliary and additive substance,
A4 flame retardant
with
B an isocyanate component
characterized in that the flame retardant A4 contains a phosphazene of formula (I)

$[P_mN_mX_k]$ (I), wherein
X independently of one another represents O-aryl or NR-aryl and at least one aryl group is substituted, wherein X may represent a bridge,
R is selected from the group of H, C1-C4-alkyl and aryl and
m represents a number from 1 to 5, preferably 3 or 4,
K is dependent on m and is equal to 2m
and the phosphazene bears no isocyanate-reactive groups.

It has now been found that, surprisingly, phosphazenes of formula (I) not only improve the flame retardancy properties of the flexible PUR foams according to the invention but also make the damping of the flexible PUR foams more advantageous.

DETAILED DESCRIPTION

In the context of the present invention an open-celled flexible PUR foam is a flexible PUR foam which preferably exhibits sufficient air exchange to avoid substantial shrinkage, i.e. upon storage of a foam specimen (50×50×30 mm$^3$) from the core of the foam in a circulating air drying cabinet at 100° C. over 20 hours none of the dimensions in any spatial direction are reduced by more than 2% in length.

Component A1

Employed as the isocyanate-reactive component A1 is at least one polyol selected from the group consisting of polyether polyols, polyester polyols, polyether ester polyols, polycarbonate polyols and polyether-polycarbonate polyols. Polyester polyols and/or polyether polyols are preferred. The individual polyol component may preferably have a hydroxyl number between 20 to 2000 mg KOH/g, in particular 25 to 60 mg KOH/g and particularly preferably 27 to 37 mg KOH/g. The individual polyol component preferably has a number-average molecular weight of 2000 g/mol to 15 000 g/mol, in particular 3000 g/mol to 12 000 g/mol and particularly preferably 3500 g/mol to 6500 g/mol. When more than only one isocyanate-reactive component are used the mixture may preferably have a hydroxyl number between 20 to 2000 mg KOH/g, in particular 25 to 100 mg KOH/g. The mixture may preferably have an equivalent weight of 0.8 to 2.2 kg/mol.

In the context of the present invention the number-average molar mass $M_n$ (also known as molecular weight) is determined by gel permeation chromatography according to DIN 55672-1 (August 2007).

In the case of a single added polyol the OH number (also known as hydroxyl number) specifies the OH number of said polyol. Reported OH numbers for mixtures relate to the number-average OH number of the mixture calculated from the OH numbers of the individual components in their respective molar proportions. The OH number specifies the amount of potassium hydroxide in milligrams which is equivalent to the acetic acid quantity bound by one gram of substance in an acetylation. In the context of the present invention said number is determined according to the standard DIN 53240-1 (June 2013).

In the context of the present invention "functionality" describes the theoretical average functionality (number of isocyanate-reactive or polyol-reactive functions in the molecule) calculated from the known input materials and their quantity ratios.

The equivalent weight specifies the ratio of the number-average molecular mass and the functionality of the isocyanate-reactive component. The reported equivalent weights for mixtures are calculated from equivalent weights of the individual components in their respective molar proportions and relate to the number-average equivalent weight of the mixture.

The polyester polyols of component A1 may be for example polycondensates of polyhydric alcohols, preferably diols, having 2 to 12 carbon atoms, preferably having 2 to 6 carbon atoms, and polycarboxylic acids, for example di-, tri- or even tetracarboxylic acids or hydroxycarboxylic acids or lactones, and it is preferable to employ aromatic dicarboxylic acids or mixtures of aromatic and aliphatic dicarboxylic acids. Also employable instead of the free polycarboxylic acids are the corresponding polycarboxylic anhydrides or corresponding polycarboxylic esters of lower alcohols to prepare the polyesters.

Contemplated carboxylic acids include in particular: succinic acid, glutaric acid, adipic acid, suberic acid, azelaic acid, sebacic acid, decanedioic acid, tetrahydrophthalic acid, hexahydrophthalic acid, cyclohexanedicarboxylic acid, tetrachlorophthalic acid, itaconic acid, malonic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, trimellitic acid, benzoic acid, maleic acid, fumaric acid, phthalic acid, isophthalic acid and terephthalic acid. Likewise employable are derivatives of these carboxylic acids, for example dimethyl terephthalate. The carboxylic acids may be employed either individually or in admixture. Preferably employed as carboxylic acids are adipic acid, sebacic acid and/or succinic acid, particularly preferably adipic acid and/or succinic acid.

Hydroxycarboxylic acids that may be co-used as co-reactants in the production of a polyester polyol having terminal hydroxyl groups include for example lactic acid, malic acid, hydroxycaproic acid, hydroxybutyric acid, hydroxydecanoic acid, hydroxystearic acid and the like. Suitable lactones are inter alia caprolactone, butyrolactone and homologs.

Suitable compounds for producing the polyester polyols also include in particular bio-based starting materials and/or derivatives thereof, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower kernel oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxyl-modified fatty acids and epoxidized fatty acids and fatty acid esters, for example based on myristoleic acid, palmitoleic acid, oleic acid, vaccenic acid, petroselic acid, gadoleic acid, erucic acid, nervonic acid, linoleic acid, alpha- and gamma-linolenic acid, stearidonic acid, arachidonic acid, timnodonic acid, clupanodonic acid and cervonic acid. Especially preferred are esters of ricinoleic acid with polyfunctional alcohols, for example glycerol. Also preferred is the use of mixtures of such bio-based acids with other carboxylic acids, for example phthalic acids.

Examples of suitable diols are ethylene glycol, butylene glycol, diethylene glycol, triethylene glycol, polyalkylene glycols such as polyethylene glycol, and also 1,2-propanediol, 1,3-propanediol, 1,3-butanediol, 1,4-butanediol, 1,6-hexanediol and isomers, neopentyl glycol or neopentyl glycol hydroxypivalate. It is preferable to employ ethylene glycol, diethylene glycol, 1,4-butanediol, 1,5-pentanediol, 1,6-hexanediol or mixtures of at least two of the recited diols, in particular mixtures of 1,4-butanediol, 1,5-pentanediol and 1,6-hexanediol.

Also employable in addition are polyols such as trimethylolpropane, glycerol, erythritol, pentaerythritol, trimethylolbenzene or trishydroxyethyl isocyanurate, wherein glycerol and trimethylolpropane are preferred.

Additional co-use of monohydric alkanols is also possible.

Polyether polyols employed according to the invention are obtained by methods of production known to those skilled in the art such as for example anionic polymerization of one or more alkylene oxides having 2 to 4 carbon atoms with alkali metal hydroxides, such as sodium or potassium hydroxide, alkali metal alkoxides, such as sodium methoxide, sodium or potassium ethoxide or potassium isopropoxide, or aminic alkoxylation catalysts, such as dimethylethanolamine (DMEOA), imidazole and/or imidazole derivatives, using at least one starter molecule containing 2 to 8, preferably 2 to 6, bound reactive hydrogen atoms.

Suitable alkylene oxides are for example tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures. Preferred alkylene oxides are propylene oxide and ethylene oxide and copolymers of propylene oxide with ethylene oxide are particularly preferred. The alkylene oxides may be reacted in combination with $CO_2$.

Contemplated starter molecules include for example: water, organic dicarboxylic acids, such as succinic acid, adipic acid, phthalic acid and terephthalic acid, aliphatic and aromatic, optionally N-mono-, N,N- and N,N'-dialkyl-substituted diamines having 1 to 4 carbon atoms in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 2,2'-, 2,4'- and 4,4'-diaminodiphenylmethane.

It is preferable to employ dihydric or polyhydric alcohols, such as ethanediol, 1,2- and 1,3-propanediol, diethylene glycol, dipropylene glycol, 1,4-butanediol, 1,6-hexanediol, triethanolamine, bisphenols, glycerol, trimethylolpropane, pentaerythritol, sorbitol and saccharose.

Polycarbonate polyols that may be used are hydroxyl-containing polycarbonates, for example polycarbonate diols. These are formed in the reaction of carbonic acid derivatives, such as diphenyl carbonate, dimethyl carbonate or phosgene, with polyols, preferably diols.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenols, and lactone-modified diols of the abovementioned type.

Also employable instead of or in addition to pure polycarbonate diols are polyether-polycarbonate diols obtainable for example by copolymerization of alkylene oxides, such as for example propylene oxide, with $CO_2$.

Employable polyether ester polyols are compounds containing ether groups, ester groups and OH groups. Organic dicarboxylic acids having up to 12 carbon atoms are suitable for producing the polyether ester polyols, preferably aliphatic dicarboxylic acids having 4 to 6 carbon atoms or aromatic dicarboxylic acids used individually or in admixture. Examples include suberic acid, azelaic acid, decanedicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. Also employable in addition to organic dicarboxylic acids are derivatives of these acids, for example their anhydrides and also their esters and monoesters with low molecular weight monofunctional alcohols having 1 to 4 carbon atoms. The use of proportions of the abovementioned bio-based starting materials, in particular of fatty acids/fatty acid derivatives (oleic acid, soybean oil etc.), is likewise possible and can have advantages, for example in respect of storage stability of the polyol formulation, dimensional stability, fire behavior and compressive strength of the foams.

Polyether polyols obtained by alkoxylation of starter molecules such as polyhydric alcohols are a further component used for producing polyether ester polyols. The starter molecules are at least difunctional, but may optionally also contain proportions of higher-functional, in particular trifunctional, starter molecules.

Starter molecules include for example diols such as 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomeric mixtures of alkylene glycols, such as diethylene glycol. Starter molecules having functionalities distinct from OH may also be employed alone or in admixture.

In addition to the diols compounds having at least 3 Zerewitinoff-active hydrogens, in particular having number-average functionalities of 3 to 8, in particular of 3 to 6, may also be co-used as starter molecules for producing the polyethers, for example 1,1,1-trimethylolpropane, triethanolamine, glycerol, sorbitan and pentaerythritol and also triol- or tetraol-started polyethylene oxide polyols.

Polyether ester polyols may also be produced by alkoxylation, in particular by ethoxylation and/or propoxylation, of reaction products obtained by the reaction of organic dicarboxylic acids and their derivatives and components with Zerewitinoff-active hydrogens, in particular diols and polyols. Derivatives of these acids that may be used include, for example, their anhydrides, for example phthalic anhydride.

Production processes of the polyols have been described for example by Ionescu in "Chemistry and Technology of Polyols for Polyurethanes", Rapra Technology Limited, Shawbury 2005, p. 55 et seq. (chapt. 4: Oligo-Polyols for Elastic Polyurethanes), p. 263 et seq. (chapt. 8: Polyester Polyols for Elastic Polyurethanes) and in particular on p. 321 et seq. (chapt. 13: Polyether Polyols for Rigid Polyurethane Foams) and p. 419 et seq. (chapt. 16: Polyester Polyols for Rigid Polyurethane Foams). It is also possible to obtain polyester and polyether polyols by glycolysis of suitable polymer recyclates. Suitable polyether-polycarbonate polyols and the production thereof are described for example in EP 2910585 A, [0024]-[0041]. Examples of polycarbonate polyols and production thereof may be found inter alia in EP 1359177 A. Production of suitable polyether ester polyols is described inter alia in WO 2010/043624 A and in EP 1 923 417 A.

Also employable in component A1 as hydroxyl-containing compounds are polymer polyols, PHD polyols and PIPA polyols. Polymer polyols are polyols containing proportions of solid polymers produced by free-radical polymerization of suitable monomers such as styrene or acrylonitrile in a base polyol. PHD (polyhydrazodicarbonamide) polyols are produced for example by in-situ polymerization of an isocyanate or an isocyanate mixture with a diamine and/or hydrazine (or hydrazine hydrate) in a polyol, preferably a polyether polyol. The PHD dispersion is preferably produced by reaction of an isocyanate mixture of 75% to 85% by weight of 2,4-tolylene diisocyanate (2,4-TDI) and 15% to 25% by weight of 2,6-tolylene diisocyanate (2,6-TDI) with a diamine and/or hydrazine hydrate in a polyether polyol produced by alkoxylation of a trifunctional starter (for example glycerol and/or trimethylolpropane). Processes for producing PHD dispersions are described for example in U.S. Pat. Nos. 4,089,835 and 4,260,530. PIPA polyols are polyether polyols modified with alkanolamines by polyisocyanate polyaddition, wherein the polyether polyol has a functionality of from 2.5 to 4.0 and a hydroxyl number of 3 mg KOH/g to 112 mg KOH/g (molecular weight from 500 g/mol to 18 000 g/mol). PIPA polyols are described in detail in GB 2 072 204 A, DE 31 03 757 A1 and U.S. Pat. No. 4,374,209 A.

Isocyanate-reactive substances having a cell opening effect may be copolymers of ethylene oxide and propylene oxide with an excess of ethylene oxide or aromatic diamines such as diethyltoluenediamine.

In addition to the above-described isocyanate-reactive compounds the component A1 may contain for example graft polyols, polyamines, polyamino alcohols and polythiols. The described isocyanate-reactive components also comprise compounds having mixed functionalities.

For production of polyurethane foams in the cold-cure process it is preferable when at least two hydroxyl-containing polyethers having an OH number of 20 to 50 mg KOH/g are employed, wherein the OH groups are composed to an extent of at least 80 mol % of primary OH groups (determination by $^1$H-NMR (e.g. Bruker DPX 400, deuterochloroform)). It is particularly preferable when the OH number is 25 to 40 mg KOH/g, very particularly preferably 25 to 35 mg KOH/g.

Optionally also employed in component A1 are compounds having at least two isocyanate-reactive hydrogen atoms and an OH number of 280 to 4000 mg KOH/g, preferably 400 to 3000 mg KOH/g, particularly preferably 1000 to 2000 mg KOH/g. This is to be understood as meaning hydroxyl-containing and/or amino-containing and/or thiol-containing and/or carboxyl-containing compounds, preferably hydroxyl-containing and/or amino-containing compounds, which serve as chain extenders or crosslinkers. These compounds generally have 2 to 8, preferably 2 to 4, isocyanate-reactive hydrogen atoms. Ethanolamine, diethanolamine, triethanolamine, sorbitol and/or glycerol may be employed for example. Further examples of compounds employable as chain extenders or crosslinkers are described in EP-A 0 007 502, pages 16-17.

The component A1 may consist of one or more of the abovementioned isocyanate-reactive components.

Component A2

Employable blowing agents A2 include chemical and physical blowing agents. Chemical blowing agents are substances which react with isocyanate groups to form the blowing gas, for example in the case of water carbon dioxide is formed and in the case of formic acid for example carbon dioxide and carbon monoxide are formed. Employable chemical blowing agents are for example water, carboxylic acids, carbamates and mixtures thereof. Preferably employed carboxylic acids are at least one compound selected from the group consisting of formic acid, acetic acid, oxalic acid, malonic acid and ricinoleic acid. It is particularly preferable to employ only water as a chemical blowing agent.

Employed as physical blowing agents are for example low-boiling organic compounds such as for example hydrocarbons, ethers, ketones, carboxylic esters, carbonic esters, halogenated hydrocarbons. Organic compounds inert towards the isocyanate component B and having boiling points below 100° C., preferably below 50° C., at atmospheric pressure are suitable in particular. These boiling points have the advantage that the organic compounds evaporate as a result of the exothermic polyaddition reaction. Examples of such preferably employed organic compounds are alkanes, such as heptane, hexane, n- and isopentane, preferably industrial mixtures of n-pentane and isopentane, n-butane and isobutane and propane, cycloalkanes, such as cyclopentane and/or cyclohexane, ethers, such as furan, dimethyl ether and diethyl ether, ketones, such as acetone and methyl ethyl ketone, alkyl carboxylates, such as methyl formate, dimethyl oxalate and ethyl acetate and halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Also preferred is the use of (hydro)fluorinated olefins, for example HFO 1233zd (E) (trans-1-chloro-3,3,3-trifluoro-1-propene) or HFO 1336mzz(Z) (cis-1,1,1,4,4,4-hexafluoro-2-butene) or additives such as FA 188 from 3M (1,1,1,2,3,4,5,5,5-nonafluoro-4-(trifluoromethyl)pent-2-ene). It is also possible to employ mixtures of two or more of the recited organic compounds. The organic compounds may also be employed in the form of an emulsion of small droplets.

At least one compound selected from the group consisting of physical and chemical blowing agents is employed as blowing agent A2. It is preferable when component A2 is composed of at least one chemical blowing agent, particularly preferably of water.

Component A3

The auxiliary and additive substances for optional use as component A3 are described for example in EP-A 0 000 389, pages 18-21. Examples of auxiliary and additive substances for optional co-use according to the invention and also details concerning ways these auxiliary and additive substances are used and function are described in Kunststoff-Handbuch, volume VII, edited by G. Oertel, Carl-Hanser-Verlag, Munich, 3rd edition, 1993, for example on pages 104-127.

Auxiliary and additive substances employable as component A3 include for example catalysts (activators), plasticizers, antioxidants, surface-active substances (surfactants), such as emulsifiers and foam stabilizers and especially those having low emissions such as for example products of the Tegostab® LF2 series, pigments, fillers (for example barium sulfate, kieselgur, carbon black chalk or precipitated chalk), additives such as reaction retarders (for example acidic substances such as hydrochloric acid or organic acyl halides), cell regulators (for example paraffins or fatty alcohols or dimethylpolysiloxanes), colorants, stabilizers against aging and weathering influences, fungiostatic and bacteriostatic substances and release agents.

Employable catalysts are for example amines, such as aliphatic tertiary amines (for example triethylamine, tetramethylbutanediamine) and cycloaliphatic tertiary amines (for example 1,4-diaza[2.2.2]bicyclooctane), amino ethers, such as aliphatic amino ethers (for example dimethylaminoethyl ether and N,N,N-trimethyl-N-hydroxyethylbisaminoethyl ether) and cycloaliphatic amino ethers (for example N-ethylmorpholine), amidines, such as aliphatic amidines and cycloaliphatic amidines, urea, derivatives of urea (for example aminoalkylureas; see, for example, EP-A 0 176 013, especially (3-dimethylaminopropylamine)urea), and tin catalysts (for example dibutyltin oxide, dibutyltin dilaurate, tin octoate). It is preferable to employ as catalyst at least one compound selected from the group consisting of urea, derivatives of the urea, amines and amino ethers. It is preferable when no tin catalysts are employed.

Examples of particularly preferred catalysts include: (3-dimethylaminopropylamine)urea, 2-(2-dimethylaminoethoxy)ethanol, N,N-bis(3-dimethylaminopropyl)-N-isopropanolamine, N,N,N-trimethyl-N-hydroxyethylbisaminoethyl ether and 3-dimethylaminopropylamine.

These particularly preferred catalysts have the advantage that they exhibit markedly reduced migration and emission behavior.

Contemplated surface-active substances include for example compounds that promote homogenization of the starting substances and are optionally also suitable for regulating the cell structure of the plastics. Examples include emulsifiers, such as the sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzenedisulfonic acid or dinaphthylmethanedisulfonic acid and ricinoleic acid; foam stabilizers, such as siloxane oxyalkylene mixed polymers and other organopolysiloxanes, ethoxylated alkylphenols, ethoxylated fatty alcohols, paraffin oils, castor oil esters or ricinoleic esters, Turkey red oil and peanut oil and cell regulators, such as paraffins, fatty alcohols and dimethylpolysiloxanes. The above-described oligomeric acrylates having polyoxyalkylene and fluoroalkane radicals as side groups are also suitable for improving the emulsifying action, cell structure and/or stabilization of the foam.

Suitable fillers, in particular reinforcing fillers, are the known-per-se customary organic and inorganic fillers, reinforcers, weighting agents, agents for improving abrasion behavior in paints, coatings etc. These especially include for example: inorganic fillers such as silicious minerals, for example phyllosilicates such as antigorite, serpentine, hornblendes, amphiboles, chrisotile, montmorillonite and talc, metal oxides such as kaolin, aluminum oxides, titanium oxides and iron oxides, metal salts, such as chalk, barite and inorganic pigments such as cadmium sulfide and zinc sulfide and also glass inter alia, and natural and synthetic fibrous minerals such as wollastonite, metal fibers and in particular glass fibers of various lengths which may optionally be coated with a size. Contemplated organic fillers include for example: carbon, melamine, colophony, cyclopentadienyl resins and graft polymers and also cellulose fibers, polyamide fibers, polyacrylonitrile fibers, polyurethane fibers and polyester fibers based on aromatic and/or aliphatic dicarboxylic esters and in particular carbon fibers.

Also contemplated as fillers are substances which can be used for producing dispersions. For example reaction products of isocyanates with a diamine and/or hydrazine hydrate used for forming PHD dispersions. These fillers themselves do not react with isocyanate groups.

The component A3 may consist of one or more of the abovementioned auxiliary and/or additive substances.

Component A4

Employed as flame retardants A4 according to the present invention are phosphazenes of formula (I),

$$[P_mN_mX_k] \qquad (I),$$

wherein

X independently of one another represents O-aryl or NR-aryl,

R is selected from the group of H, C1-C4 alkyl and aryl and m represents a number from 1 to 5, particularly preferably 3 or 4, K is dependent on m and is equal to 2m The phosphazenes according to the invention also have the feature that they contain no isocyanate-reactive groups. This is advantageous because the phosphazenes are thus not incorporated into the polyurethane scaffold of the flexible foam during the reaction of the component A with B. This allows them to be converted more easily into the gas phase where they result in incomplete combustion and thus reduced evolution of heat. This in turn is advantageous since reduced evolution of heat results in reduced decomposition of the polymer. It is preferable when the flame retardant A4 in its entirety contains no components having isocyanate-reactive groups.

The at least one substituent of the at least one substituted aryl group of O-aryl or NR-aryl of the substituent X is preferably selected from CN, $C_1$-$C_4$ alkyl, nitro, sulfonate, carboxylate or phosphonate groups, wherein N(aryl) is preferably substituted with at least one C1-C4 alkyl group and O-aryl is preferably substituted with at least one CN or C1-C4 alkyl group.

It is particularly preferable when X in formula (I) represents O-aryl groups, very particularly preferably O—$C_6H_4$CN, O—$C_6H_4$COOR, O—$C_6H_4CH_3$ and mixtures thereof with O—$C_6H_5$.

Greatest preference is given to using phosphazenes having a cyclic structure and conforming to general formulae (III) to (VI)

(III)

-continued

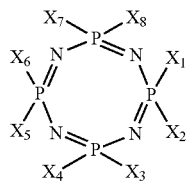
(IV)

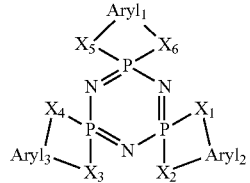
(V)

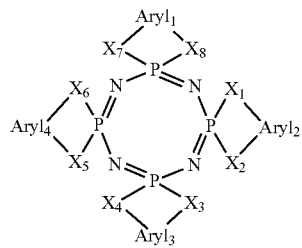
(VI)

wherein
- X independently of one another represents O-aryl or NR-aryl,
- Aryl independently represents a substituted aryl radical and
- R is selected from the group of H, $C_1$-$C_4$ alkyl and aryl.

Particularly suitable phosphazenes are those bearing six aryloxy groups which in turn bear on the aryl radical further groups such as for example $CH_3$ or CN to an extent of at least 10%: These include for example the compounds having the CAS Numbers 2040915-36-2, 1207718-93-1.

It is possible to employ one or more phosphazenes of formula (I) as the flame retardant A4 and it is also possible to employ further flame retardants in addition to the phosphazenes of formula (I). The proportion of the phosphazene of formula (I) in the flame retardant A4 may be for example 50% by weight to 100% by weight, preferably 80% by weight to 100% by weight and particularly preferably 100% by weight in each case based on the total mass of the flame retardant A4.

The proportion of phosphazene of formula (I) in the reaction mixture containing the components A1 to A4 (without component B) may be for example 0.5% by weight to 40.0% by weight, preferably 1.0% by weight to 20.0% by weight, particularly preferably 2.0% by weight to 15.0% by weight.

Employable as further flame retardants are for example phosphates or phosphonates such as for example tricresyl phosphate, diphenylcresyl phosphate (DPC), triethyl phosphate (TEP), dimethylmethyl phosphonate (DMMP), diethyl diethanolaminomethylphosphonate, diethylethyl phosphonate (DEEP) and/or dimethylpropyl phosphonate (DMPP) or the hydroxymethyl phosphonates described in U.S. Pat. No. 3,385,801, US2015/0080487, DE19744 426. Further suitable flame retardants include for example brominated esters, brominated ethers (Ixol) or brominated alcohols such as dibromoneopentyl alcohol, tribromoneopentyl alcohol, tetrabromophthalate diol and chlorinated phosphates such as tris(2-chloroethyl) phosphate, tris(2-chloropropyl) phosphate (TCPP), tris(1,3-dichloropropyl) phosphate, tris(2,3-dibromopropyl) phosphate, tetrakis(2-chloroethyl) ethylene diphosphate and commercially available halogen-containing flame retardant polyols. It is preferable to employ halogen-free flame retardants, particularly preferably at least one compound selected from the group consisting of halogen-free phosphates and halogen-free phosphonates, particularly preferably at least one compound selected from the group consisting of tricresyl phosphate, diphenylcresyl phosphate (DPC), triethyl phosphate (TEP), dimethylmethyl phosphonate (DMMP), diethyl diethanolaminomethylphosphonate, diethylethyl phosphonate (DEEP) and dimethylpropyl phosphonate.

Component B

Employed as component B are aliphatic, cycloaliphatic, araliphatic, aromatic and heterocyclic polyisocyanates, such as are described for example by W. Siefken in Justus Liebigs Annalen der Chemie, 562, pages 75 to 136, for example those of formula (II)

$$Q(NCO)_n \qquad (II)$$

in which
- n=a number between 2 to 6, preferably 2 to 3, and
- Q represents an aromatic or aliphatic hydrocarbon radical having 2 to 40 and preferably 7 to 20 carbon atoms, a cycloaliphatic hydrocarbon radical having 4 to 15 and preferably 6 to 13 carbon atoms, or an araliphatic hydrocarbon radical having 8 to 15 and preferably 8 to 13 carbon atoms.

Concerned here are, for example, polyisocyanates as described in EP-A 0 007 502, pages 7-8. Particular preference is generally given to the readily industrially obtainable polyisocyanates, for example 2,4- and 2,6-tolylene diisocyanate and any desired mixtures of these isomers ("TDI"); polyphenyl polymethylene polyisocyanates such as are prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates" or "prepolymers"), in particular modified polyisocyanates which derive from 2,4- and/or 2,6-tolylene diisocyanate or from diphenylmethane 4,4'- and/or 2,4'- and/or 2,2'-diisocyanate. Preferably employed as component B is at least one compound selected from the group consisting of tolylene 2,4- and 2,6-diisocyanate, diphenylmethane 4,4'- and 2,4'- and 2,2'-diisocyanate and polyphenyl polymethylene polyisocyanate ("polycyclic MDI", "pMDI"), particularly preferably at least one compound selected from the group consisting of diphenylmethane 4,4'- and 2,4'- and 2,2'-diisocyanate and polyphenyl polymethylene polyisocyanate ("polycyclic MDI" or "pMDI").

The mixtures of diphenylmethane diisocyanate and polyphenylene polymethylene polyisocyanate ("polycyclic MDI" or "pMDI") have a preferred monomer content between 50% and 100% by weight, preferably between 60% and 95% by weight, particularly preferably between 75% and 90% by weight. The NCO content of the polyisocyanate used should preferably exceed 25% by weight, preferably 30% by weight, more preferably 31.4% by weight. The employed MDI should preferably have a content of 2,4'-diphenylmethane diisocyanate of at least 3% by weight, preferably at least 15% by weight.

In addition to the abovementioned polyisocyanates it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4''-triisocyanate.

The isocyanate index (also known as the index) is to be understood as meaning the quotient of the actually employed amount of substance [mol] of isocyanate groups and the actually employed amount of substance [mol] of isocyanate-reactive groups, multiplied by 100:

Index=(mols of isocyanate groups/mols of isocyanate-reactive groups)*100.

In the reaction mixture the number of NCO groups in the isocyanate and the number of isocyanate-reactive groups may result in an index of 60 to 250, preferably between 70 and 130 and particularly preferably between 75 and 120.

The NCO value (also known as NCO content, isocyanate content) is determined according to EN ISO 11909:2007. Unless otherwise stated values at 25° C. are concerned.

The component B may consist of one or more of the abovementioned isocyanate components.

The invention likewise relates to a flexible PUR foam that has been produced by the process according to the invention.

The flexible PUR foams may be produced as molded foams or else as slabstock foams. It is preferable when they are produced as molded foams.

The processes for producing flexible PUR foams are known per se and are described for example in Kunststoff-Handbuch, volume VII, edited by Vieweg and Höchtlen, Carl-Hanser-Verlag, Munich 1993, pages 139-265, or by N. Adam et al. in Ullmann's Encyclopedia of Industrial Chemistry, 7th edition 2005 in the chapter "Polyurethanes". Flexible PUR foams may be produced in the hot- or cold-cure process, preference being given to the cold-cure process.

The process according to the invention for producing flexible PUR foams from the inventive components affords flexible PUR foams having good flame retardancy and damping properties coupled with reduced health disadvantages compared to the prior art.

The present invention therefore also provides the flexible PUR foams produced with the components according to the invention, provides for the use of said foams for producing moldings and provides the moldings themselves.

The flexible PUR foams obtainable according to the invention find use for example in furniture cushioning, textile padding, mattresses, automobile seats, headrests, armrests, sponges and building elements and also seat and dashboard trim and have indices of 50 to 250, preferably 70 to 130, particularly preferably 75 to 115.

A preferred process according to the invention for producing the flexible PUR foams according to the invention comprises reacting component A containing A1 39.50% to 99.28% by weight (based on the components A1 to A4) of a polyether polyol or a mixture of polyether polyols, preferably polymers based on propylene oxide and ethylene oxide, having an average equivalent weight of 0.8 to 2.2 kg/mol and an average functionality of 1.8 to 6.2, A2 0.2% to 20.0% by weight (based on the components A1 to A4) of water, A3 0.02% to 3.02% by weight (based on the components A1 to A4) of aliphatic amines as catalysts, preferably those containing OH or NH groups, and up to 30% by weight (based on the components A1 to A4) of fillers that are stably dispersed in A1 and not isocyanate-reactive, A4 0.5% to 8.0% by weight (based on the components A1 to A4) of flame retardant, with the isocyanate component B, characterized in that the flame retardant A4 contains a phosphazene of formula (I)

In a further preferred embodiment cyclic phosphazenes having a melting point below the temperature reached by the foam during production are employed. Phosphazenes having a melting point below 80° C. are preferred.

In a preferred embodiment mixtures of MDI and TDI isomers are used as component B, wherein the weight ratio of MDI isomers to TDI isomers is between 4:1 and 1:4. The mixture of MDI and TDI isomers preferably contains 15% to 75% by weight of 4,4-MDI, 0% to 30% by weight of 2,4-MDI, 10% to 30% by weight of polymeric MDI and homologs, wherein the balance to 100% by weight is composed of TDI isomers.

In a further preferred embodiment the components A and/or B may contain polyhydrazodicarbonamide in an amount of 1% to 10% by weight based on the total weight of the components A and B.

In a first embodiment the invention relates to a process for producing open-celled flexible PUR foams by reacting a component A containing A1 an isocyanate-reactive component,
A2 blowing agent containing water,
A3 optionally auxiliary and additive substance,
A4 flame retardant
with
B an isocyanate component,
characterized in that the flame retardant A4 contains a phosphazene of formula (I)

wherein
X independently of one another represents O-aryl or NR-aryl and on average over all phosphazenes at least 10% of the aryl groups are substituted, wherein X may represent a bridge,
R is selected from the group of H, C1-C4 alkyl and aryl and
m represents a number from 1 to 5, particularly preferably 3 or 4,
k is dependent on m and represents a number from 0 to 2m and the phosphazene bears no isocyanate-reactive groups.

In a second embodiment the invention relates to a process according to embodiment 1, characterized in that the isocyanate-reactive component A1 contains polyether polyols having a hydroxyl number of 25 mg KOH/g to 2000 mg KOH/g.

In a third embodiment the invention relates to a process according to embodiment 1 or 2, characterized in that the isocyanate-reactive component A1 contains a PHD polyol.

In a fourth embodiment the invention relates to a process according to any of the embodiments 1-3, characterized in that the blowing agent A2 contains at least one compound selected from the group consisting of halogen-free chemical blowing agents, halogen-free physical blowing agents and (hydro)fluorinated olefins.

In a fifth embodiment the invention relates to a process according to any of the embodiments 1-4, characterized in that the flame retardant A4 contains no components having isocyanate-reactive groups.

In a sixth embodiment the invention relates to a process according to any of the embodiments 1-5, characterized in that the flame retardant A4 contains 50% by weight to 100% by weight based on the total mass of the flame retardant A4 of the phosphazene according to formula (I).

In a seventh embodiment the invention relates to a process according to any of the embodiments 1-6, characterized in that the content of phosphazene of formula (I) is 0.5% by weight to 40.0% by weight based on the reaction mixture A1-A4 without B.

In an eighth embodiment the invention relates to a process according to any of the embodiments 1-7, characterized in that the flame retardant A4 contains at least one compound selected from the group consisting of halogen-free phosphates and halogen-free phosphonates.

In a ninth embodiment the invention relates to a process according to any of embodiments 1-8, characterized in that the at least one substituent of the at least one substituted aryl group of O-aryl or NR-aryl of the substituent X is selected from CN, $C_1$-$C_4$ alkyl, nitro, sulfonate, carboxylate or phosphonate groups, wherein N(aryl) is preferably substituted with at least one $C_1$-$C_4$ alkyl group and O-aryl is preferably substituted with at least one CN, COOR or $C_1$-$C_4$ alkyl group.

In a tenth embodiment the invention relates to a process according to any of embodiments 1-9, characterized in that the phosphazene is a cyclic phosphazene and preferably has a structure of general formulae (III) to (VI)

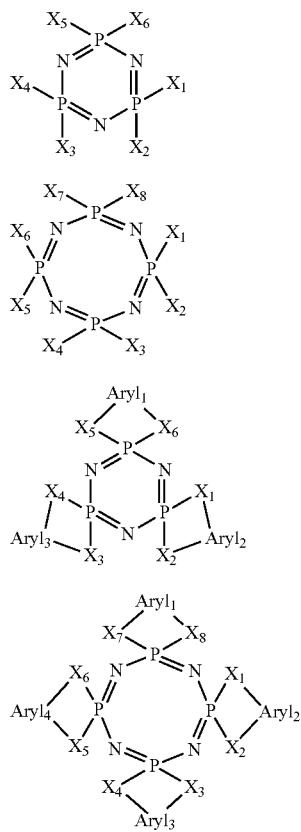

wherein
X independently of one another represents O-aryl or NR-aryl,
Aryl independently represents a substituted aryl radical and
R is selected from the group of H, $C_1$-$C_4$ alkyl and aryl.

In an eleventh embodiment the invention relates to a process according to any of embodiments 1-10, characterized in that the component A contains
A1 39.50% to 99.28% by weight (based on the components A1 to A4) of a polyether polyol or a mixture of polyether polyols, preferably based on propylene oxide and ethylene oxide, having an average equivalent weight of 0.8 to 2.2 kg/mol and an average functionality of 1.8 to 6.2,
A2 0.2% to 20.0% by weight (based on the components A1 to A4) of water,
A3 0.02% to 3.02% by weight (based on the components A1 to A4) of aliphatic amines as catalysts, preferably those containing OH or NH groups, and up to 30% by weight (based on the components A1 to A4) of fillers that are stably dispersed in A1 and not isocyanate-reactive,
A4 0.5% to 8.0% by weight (based on the components A1 to A4) of flame retardant.

In a twelfth embodiment the invention relates to a process according to any of embodiments 1-11, characterized in that component B contains at least one compound selected from the group consisting of 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, polyphenylpolymethylene polyisocyanate and polyisocyanates which comprise carbodiimide groups, urethane groups, allophanate groups, isocyanurate groups, urea groups or biuret groups and derive from 2,4- and/or 2,6-tolylene diisocyanate or from 4,4'- and/or 2,4'- and/or 2,2'-diphenylmethane diisocyanate.

In a thirteenth embodiment the invention relates to a process according to any of embodiments 1-12, characterized in that the content of difunctional isocyanates in the component B is 60% to 100% by weight, preferably 75% to 90% by weight, based on the component B.

In a fourteenth embodiment the invention relates to a flexible PUR foam obtainable by the process as claimed in any of the embodiments 1 to 13, wherein the apparent density of the flexible PUR foam is in particular
between 10 kg/m³ and 20 kg/m³ or
between 35 kg/m³ and 80 kg/m³ and the isocyanate index is between 60 and 110 or
between 200 kg/m³ and 300 kg/m³ and the isocyanate index is between 75 and 120.

In a fourteenth embodiment the invention relates to the use of flexible PUR foams according to embodiment 13 or 14 for producing furniture cushioning, textile padding, mattresses, automobile seats, headrests, armrests, sponges and building elements and also seat and dashboard trim.

The preferred embodiments may be carried out individually or else in conjunction with one another.

Examples

The present invention is elucidated further by the examples which follow, but without being restricted thereto.

| | |
|---|---|
| A1-1 | glycerol-started polyalkylene oxide having a molecular weight of 4800 g/mol, employed as suspension with A3-1 |
| A2-1 | 25% by weight urea in water |
| A3-1 | reaction product of tolylene diisocyanate (TDI) and hydrazine hydrate employed as suspension with A1-1 |

-continued

| | |
|---|---|
| A3-2 | mixture of Jeffcat ® ZF-10 (Huntsman) and Dabco ® NE1070 Air Products) in a weight ratio of 1:20 |
| A3-3 | Tegostab ® B 8738 LF2, polyetherdimethylsiloxane (Evonik) |
| A4-1 | Rabitle ® FP 200, cyclic phosphazene with phenoxy and methoxy substituents (Fushimi Pharmaceuticals, halogen-free) |
| A4-2 | Rabitle ® FP 300-B, cyclic phosphazene with cyanophenoxy substituents (Fushimi Pharmaceuticals, halogen-free) |
| A4-3 | Rabitle ® FP 366, cyclic phosphazene with propoxy substituents (Fushimi Pharmaceuticals, halogen-free) |
| A4-4 | Rabitle ® FP 390, cyclic phosphazene with tolyloxy and phenoxy substituents (Fushimi Pharmaceuticals, halogen-free) |
| A4-5 | trischloropropyl phosphate, halogenated flame retardant |
| A4-6 | melamine, halogen-free solid flame retardant insoluble in all other components |
| A4-7 | NCO-reactive reaction product of 60 g of A4-2 and 8 dm$^3$ of hydrogen in 0.42 dm$^3$ of THF at 10 bar over Pd/C as catalyst. The amine number of 66.45 mg KOH/g results in an equivalent weight of 884 g/mol $CH_2$—$NH_2$. $^{31}$P-NMR (400 MHz, CDCl$_3$): 8.01 and 7.94 ppm vs. H$_3$PO$_4$ (for comparison A4-2: 7.49, 7.54 ppm). Complete disappearance of the doublets at 7.50 ppm and 7.40 ppm in the $^1$H-NMR (400 MHz, CDCl$_3$) indicates complete hydrogenation of the nitrile groups in A4-2. The signal of the $CH_2$—$NH_2$ group appears in the $^1$H-NMR at 3.70 ppm vs. TMS. ASAP-MS: m/z 694 (10%, M + H$^+$, $C_{36}H_{30}N_3O_6P_3$, CAS 1184-10-7), m/z 708 (10%, M + H$^+$, $C_{37}H_{32}N_3O_6P_3$), m/z 723 (60%, M + H$^+$, $C_{37}H_{33}N_4O_6P_3$, CAS 81525-08-8), m/z 737 (100%, M + H$^+$, $C_{37}H_{35}N_5O_6P_3$), m/z 752 (40%, M + H$^+$, $C_{38}H_{36}N_5O_6P_3$). $C_{37}H_{33}N_4O_6P_3$, CAS 81525-08-8, contains one aminomethyl group. $C_{38}H_{36}N_5O_6P_3$ contains two aminomethyl groups. Both are thus suitable for reaction with isocyanate |
| B-1 | Desmodur ® 44V20L, isocyanate comprising 31.5% by weight of NCO groups and having a viscosity of 0.2 Pa * s at 298K (Covestro) |
| B-2 | Desmodur ® T80, isocyanate comprising 48% by weight of NCO groups, mixture of 80% by weight of 2,4-TDI and 20% by weight of 2,6-TDI (Covestro) |

Production and Testing of Flexible PUR Foams

The fire test is based on British standard BS 5852:1990-part 2 with ignition source 4 ("Crib") but was performed without a textile covering layer.

Measurement of apparent density was performed according to DIN EN ISO 845 (October 2009).

The compressive strength and damping of the flexible PUR foam were measured according to DIN EN ISO 3386-1 (September 2010).

To produce the flexible PUR foams the required amount of component A was initially charged into a cardboard beaker having a sheet metal bottom (volume: about 850 ml) and loaded with air using a stirring means (Pendraulik) fitted with a standard stirring disk (d=64 mm) at 4200 rpm for 45 seconds. The component B was then added to the component A and the mixture was subjected to intensive mixing with a stirring means for 5 seconds. The precise composition of the individual components is summarized in table 1. To determine the characteristic reaction times a stopwatch was started at commencement of mixing. About 93 g of the reaction mixture were subsequently poured into a Teflon film-lined aluminum box mold having a volume of 1.6 dm$^3$ and a temperature of 23° C. The mold was closed and bolted shut for 6 minutes. The mechanical and flame retardancy tests were determined on the molded foam and the reaction kinetics were determined on the freely foaming reaction mixture in the beaker.

The cream time $t_C$ has been reached when an expanding of the mixture is observed (commencement of the reaction of isocyanate and water). The fiber time $t_G$ determines the time at which dabbing a wooden rod on the surface of the rising flexible PUR foam results in fibers being drawn. The full rise time $t_S$ has been reached when the expansion of the flexible PUR foam has finally ceased. It should be noted here that some systems have a propensity to undergo some sagging before rising again.

It is apparent from table 1, "kinetics and mechanical properties" part that examples 2 to 5 comprising phosphazenes as flame retardants have similar apparent core densities (AD) to examples 1 and 6 without flame retardants and with TCPP as the flame retardant. The flexible PUR foam from example 7 with melamine as the flame retardant has an elevated apparent density in contrast to the other flexible PUR foams. The plasticizing effect is however not as pronounced as for TCPP. The effect of the flame retardants from example 2 to 6 as plasticizers, which makes them particularly suitable for flexible PUR foams, is also apparent. Example 1 and especially example 7 show a marked hardening of the flexible PUR foam. The damping of the flexible PUR foams of examples 3-5 is superior in comparison to the flexible PUR foams without flame retardants, with TCPP and with melamine.

The behavior of the flexible PUR foams in the fire test is shown in table 1 in the "fire test behavior" part. The molar fractions of the employed flame retardant A4 in examples 2 to 7 are used to assess the efficiency of the flame retardant: The greater this difference the faster the flame is extinguished and the more efficient is the flame retardant.

It is apparent that the examples 2 and 4 in which phosphazenes not having the inventive formula (I) were used as flame retardants do not result in self-extinguishing flexible PUR foams. It is moreover apparent that example 7 which was produced with a flame retardant that is not low melting or liquid results in identical fire behavior to example 1. A particularly marked shortening of the time until self-extinguishing per mmol of employed flame retardant A4 is shown especially by example 3. The flame retardant in example 5 is just as efficient or slightly more efficient than the flame retardant in example 6, wherein example 6 contains a halogenated flame retardant and accordingly has disadvantages such as for example corrosive hydrochloric acid in smoke gases.

TABLE 1

| | | Composition of the reaction mixtures | | | | | | | |
|---|---|---|---|---|---|---|---|---|---|
| | | 1 | 2 | 3 | 4 | 5 | 6 | 7 | 8 |
| | 1) | Comparative | Comparative | Inventive | Comparative | Inventive | Comparative | Comparative | Comparative |
| A1-1 | % by weight | 80.75 | 77.65 | 77.65 | 77.65 | 77.65 | 77.65 | 77.65 | 77.65 |
| A2-1 | % by weight | 3.3 | 3.17 | 3.17 | 3.17 | 3.17 | 3.17 | 3.17 | 3.17 |
| A3-1 | % by weight | 14.25 | 13.5 | 13.5 | 13.5 | 13.5 | 13.5 | 13.5 | 13.5 |
| A3-2 | % by weight | 1.05 | 1 | 1 | 1 | 1 | 1 | 1 | 1 |
| A3-3 | % by weight | 0.65 | 0.63 | 0.63 | 0.63 | 0.63 | 0.63 | 0.63 | 0.63 |

TABLE 1-continued

Composition of the reaction mixtures

Flame retardant

| | | | | | | | | | |
|---|---|---|---|---|---|---|---|---|---|
| A4-1 | % by weight | | 4.2 | | | | | | |
| A4-2 | % by weight | | | 4.2 | | | | | |
| A4-3 | % by weight | | | | 4.2 | | | | |
| A4-4 | % by weight | | | | | 4.2 | | | |
| A4-5 | % by weight | | | | | | 4.2 | | |
| A4-6 | % by weight | | | | | | | 4.2 | |
| A4-7 | % by weight | | | | | | | | 4.2 |
| Isocyanate | 2) | | | | | | | | |
| B1 | g/100 g A | 8.8 | 8.8 | 8.8 | 8.8 | 8.8 | 8.8 | 8.8 | 8.8 |
| B2 | g/100 g A | 20.4 | 20.4 | 20.4 | 20.4 | 20.4 | 20.4 | 20.4 | 20.4 |
| Index | | 85 | 85 | 85 | 85 | 85 | 85 | 85 | 85 |

1) the reported % by weight relates to the sum of the components A1 to A4 = 100% by weight.
2) the content of molecules having two NCO groups per molecule based on the sum of B1 and B2 is 83% by weight in all cases (continued, kinetics and mechanical properties)

| | | | | | | | | | |
|---|---|---|---|---|---|---|---|---|---|
| Cream time $t_c$ | s | 5 | 6 | 4 | 6 | 6 | 5 | 5 | 5 |
| Fiber time $t_G$ | s | 45 | 67 | 47 | 75 | 75 | 55 | 60 | 55 |
| Full rise time $t_s$ | s | 90 | 10 | 87 | 112 | 126 | 105 | 105 | 93 |
| Apparent density (AD) from core of molding | kg/m³ | 44 | 44 | 46 | 46 | 46 | 45 | 49 | n.s. |
| Compressive strength (CV40) at 40% compression | kPa | 3.7 | 2.9 | 3.1 | 3.2 | 3.0 | 2.6 | 5.0 | n.s. |
| Damping | | 24% | 23% | 22% | 22% | 22% | 24% | 26% | n.s. |
| CV40/AD | m²/s² | 86 | 66 | 67 | 71 | 65 | 58 | 102 | n.s. | n.s.: The mechanical data for comparative test 8 could not be specified.

(continued, fire test behavior)

| | | | | | | | | | |
|---|---|---|---|---|---|---|---|---|---|
| Proportion of flame retardant (A4) based on the sum of m(A1 to A4)²⁾ | mmol/kg | 0 | 99 | 58 | 105 | 64 | 127 | 350 | 58 |
| Melting point of flame retardant | °C. | — | <20 | 72 | <20 | <20 | −52 | 350 (decomposition) | <20 |
| $t_{SE}$ 3) | s | 87 | >95 | 68 | >95 | 83 | 81 | 87 | 91 |
| $\Delta t_{SE}$ 4) | s | 0 | Not self-extinguishing | 19 | Not self-extinguishing | 4 | 6 | 0 | −4 |
| $\Delta t_{SE}$ per mmol of flame retardant 5) | s/mmol | | | 0.35 | | 0.06 | 0.05 | 0 | −0.07 |

2) proportion of the amount of substance (in mmol) of the flame retardant A4 used in the particular test per the sum of the masses (in kg) of the employed components A1 to A4.
3) $t_{SE}$: Time measured until self-extinguishing $t_{SE}$ of flexible PUR foam.
4) $\Delta t_{SE}$: The difference between the time $t_{SE}$ and the corresponding time measured for the reference sample without flame retardant is reported in seconds.
5) $\Delta t_{SE}$ per mmol of flame retardant: $\Delta t_{SE}$ based on the amount of substance (in mmol) of the flame retardant A4 employed in the particular test.

The invention claimed is:

1. A process for producing open-celled flexible PUR foams comprising reacting a component A which comprises A1 an isocyanate-reactive component,
A2 a blowing agent comprising water,
A3 optionally auxiliary and/or additive substances,
A4 a flame retardant
with
B an isocyanate component,
wherein the flame retardant A4 comprises a phosphazene corresponding to formula (I)

$$[P_m N_m X_k] \quad (I),$$

wherein
each X independently of one another represents O-aryl or NR-aryl and on average over all phosphazenes at least 10% of the aryl groups are substituted, wherein X may represent a bridge, wherein:

R represents a H atom, a C1-C4 alkyl group, or an aryl group,
and
m represents a number from 1 to 5,
k is dependent on m and is equal to 2m
with the proviso that the phosphazene is free of isocyanate-reactive groups.

2. The process as claimed in claim 1, wherein the isocyanate-reactive component A1 comprises a polyether polyol having a hydroxyl number of 25 mg KOH/g to 2000 mg KOH/g.

3. The process as claimed in claim 1, wherein the isocyanate-reactive component A1 comprises a polyhydrazodicarbonamide polyol.

4. The process as claimed in claim 1, wherein the blowing agent A2 additionally comprises at least one compound comprising at least one of a halogen-free chemical blowing agent, a halogen-free physical blowing agent, and a (hydro)fluorinated olefin.

5. The process as claimed in claim 1, wherein the flame retardant A4 is free of components having isocyanate-reactive groups.

6. The process as claimed in claim 1, wherein the flame retardant A4 comprises 50% by weight to 100% by weight, based on the total mass of the flame retardant A4, of the phosphazene corresponding to formula (I).

7. The process as claimed in claim 1, wherein the content of phosphazene corresponding to formula (I) is 0.5% by weight to 40.0% by weight based on 100% of the combined weight of A1, A2, A3 and A4.

8. The process as claimed in claim 1, wherein the flame retardant A4 additionally comprises at least one compound comprising at least one of a halogen-free phosphate and a halogen-free phosphonate.

9. The process as claimed in claim 1, wherein the aryl group of O-aryl or NR-aryl of the substituent X is substituted with at least one of a CN group, a C1-C4 alkyl group, a nitro group, a sulfonate group, a carboxylate group, and a phosphonate group.

10. The process as claimed in claim 1, wherein the phosphazene comprises a cyclic phosphazene.

11. The process as claimed in claim 1, wherein component A comprises
   A1 39.50% to 99.28% by weight (based on 100% of the combined weight of components A1, A2, A3 and A4) of a polyether polyol or a mixture of polyether polyols, having an average equivalent weight of 0.8 to 2.2 kg/mol and an average functionality of 1.8 to 6.2,
   A2 0.2% to 20.0% by weight (based on 100% of the combined weight of components A1, A2, A3 and A4) of water,
   A3 0.02% to 3.02% by weight (based on 100% of the combined weight of components A1, A2, A3 and A4) of at least one catalyst comprising an aliphatic amine, and up to 30% by weight (based on 100% of the combined weight of components A1, A2, A3 and A4) of fillers that are stably dispersed in A1 and not isocyanate-reactive,
   A4 0.5% to 8.0% by weight (based on 100% of the combined weight of components A1, A2, A3 and A4) of flame retardant.

12. The process as claimed in claim 1, wherein component B comprises 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, polyphenylpolymethylene polyisocyanate, polyisocyanates which comprise carbodiimide groups, urethane groups, allophanate groups, isocyanurate groups, urea groups or biuret groups and derive from 2,4- and/or 2,6-tolylene diisocyanate or from 4,4'- and/or 2,4'- and/or 2,2'-diphenylmethane diisocyanate, or combinations thereof.

13. The process as claimed in any of claim 1, wherein component B comprises 60% to 100% by weight of difunctional isocyanates, based on 100% by weight of component B.

14. A flexible PUR foam obtainable by the process as claimed in claim 1, wherein the apparent density of the flexible PUR foam is between 10 kg/m³ and 20 kg/m³, or between 35 kg/m³ and 80 kg/m³ and the isocyanate index is between 60 and 110, or between 200 kg/m³ and 300 kg/m³ and the isocyanate index is between 75 and 120.

15. An article comprising the flexible PUR foam as claimed in claim 14, in furniture cushions, textile inserts, bedding, automotive, sponges, and/or construction industries.

16. The process as claimed in claim 9, wherein the aryl group of O-aryl is substituted with at least one of a CN group, a COOR group, and a $C_1$-$C_4$ alkyl group.

17. The process as claimed in claim 9, wherein the aryl group of NR-aryl is substituted with at least one $C_1$-$C_4$ alkyl group.

18. The process as claimed in claim 10, wherein the cyclic phosphazene has a structure corresponding to one of the general formulae (III) to (VI)

(III)

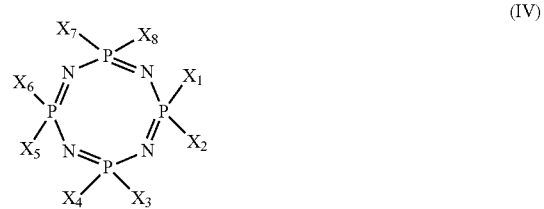

(IV)

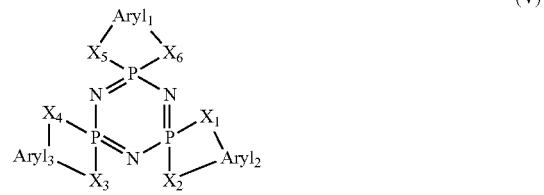

(V)

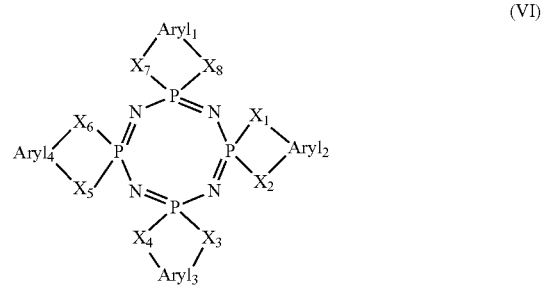

(VI)

wherein
  each X independently of one another represents O-aryl or NR-aryl, in which
  each aryl independently represents a substituted aryl radical,
  and
    R represents a H atom, a $C_1$-$C_4$ alkyl group, or an aryl group.

* * * * *